United States Patent [19]
Haynes

[11] Patent Number: 4,802,362
[45] Date of Patent: * Feb. 7, 1989

[54] FLUID FLOW SENSOR

[76] Inventor: Joel E. Haynes, 18316 Oxnard St., Tarzana, Calif. 91356

[*] Notice: The portion of the term of this patent subsequent to Jan. 13, 2004 has been disclaimed.

[21] Appl. No.: 914,466

[22] Filed: Nov. 17, 1986

Related U.S. Application Data

[60] Division of Ser. No. 790,595, Oct. 23, 1985, Pat. No. 4,635,476, which is a continuation of Ser. No. 589,592, Mar. 14, 1984, abandoned.

[51] Int. Cl.⁴ ............................................. G01F 11/04
[52] U.S. Cl. ........................................ 73/249; 73/239
[58] Field of Search .................. 73/239, 243, 249, 250

[56] References Cited

U.S. PATENT DOCUMENTS

| | | | |
|---|---|---|---|
| 35,806 | 7/1862 | Aubin | 73/249 |
| 400,401 | 3/1889 | Gutzkow | 73/249 |
| 1,974,202 | 9/1934 | Blum | 73/239 X |
| 4,055,084 | 10/1977 | Wilde | 73/249 |
| 4,192,185 | 3/1980 | Keilholz | 73/243 |
| 4,240,291 | 12/1980 | Andersson | 73/239 X |

Primary Examiner—Herbert Goldstein
Attorney, Agent, or Firm—Spensley Horn Jubas & Lubitz

[57] ABSTRACT

A fluid flow sensor comprises a housing having a fluid inlet and a fluid outlet, a measuring chamber in the housing connected at opposite ends to both the fluid inlet and the fluid outlet, a member in the chamber movable between opposite ends of the chamber, and a valve assembly for controlling fluid flow through the housing. The valve assembly is movable between a first position in which it cuts off one end of the chamber from the outlet so that fluid in that end of the chamber acts on the movable member to urge it to the other end of the chamber, and a second position in which it cuts off the other end of the chamber from the outlet so that the member is urged back in the opposite direction. The member oscillates back and forth at a rate proportional to the flow rate.

4 Claims, 1 Drawing Sheet

FLUID FLOW SENSOR

This is a division of application Ser. No. 790,595, now U.S. Pat. No. 4,635,476, filed on Oct. 23, 1985 which itself is a continuation of application Ser. No. 589,592 filed on Mar. 14, 1984, abandoned.

BACKGROUND OF THE INVENTION

The present invention relates to flow meters, more particularly to devices capable of measuring the flow of liquids with large variations in viscosity.

There are various types of known flow meters or sensors, for example those using differential pressure or area to measure the flow, volume measuring devices, mass flow meters and rotating body type devices. U.S. Pat. Nos. 2,518,149 and 3,805,609 show flow meters of the rotating body type in which a swirling stream of fluid is used to rotate a body in the swirling stream path, the rotation of the body giving a measurement of the flow rate.

The rotating body type of flow meter, as well as the differential pressure and area types of device, are generally not very accurate with changes of viscosity, since they depend on directional forces for their operation. These forces change radically with changes in viscosity.

Volume measuring devices generally depend upon precision cylinders and usually will not measure continuous flow rate. They are expensive to manufacture and maintain. Mass flow meters are very expensive and generally will not handle a large variation in viscosity.

SUMMARY OF THE INVENTION

It is an object of the present invention to provide a fluid flow sensor which gives a relatively high degree of accuracy and which can measure the flow of liquids over a wide range of viscosities.

Another object of this invention is to provide a flow meter which remains accurate under low pressure conditions.

It is a further object of the invention to provide such a sensor which is relatively inexpensive to manufacture.

According to the present invention a fluid flow sensor for measuring the volumetric flow of a fluid is provided, which comprises a housing having a fluid inlet and a fluid outlet, a measuring chamber in the housing connected at opposite ends to both the fluid inlet and the fluid outlet, a member, preferably a ball, in the chamber movable between the opposite ends of the chamber, and a valve assembly for controlling fluid flow through the chamber. The valve assembly is movable between a first position in which a first end of the chamber is cut off from the outlet such that fluid in that end of the chamber acts on the movable member in a first direction to urge it to the opposite, second end of the chamber, and a second position in which the second end of the chamber is cut off from the outlet so that the fluid acts in the opposite direction to urge the movable member back to the first end of the chamber. The valve assembly is responsive to movement of the movable member such that when the movable member moves to the first end of the chamber the valve assembly moves to the first position and when the movable member moves to the second end of its chamber the valve assembly moves to the second position.

Thus the movable member will osillate from one end of the measuring chamber to the other at a rate proportional to the fluid flow rate. The flow rate can therefore be measured by counting the rate of oscillation of the ball member. This can be done by any suitable sensing device mounted adjacent to the measuring chamber. For example, a photo-sensitive device such as a photocell or photodiode may be arranged to detect interruptions of a light beam directed across the chamber. Alternatively a magnetic or variable reluctance pickup, or a reflective sensor could be used, for example.

The sensor will operate over a large range of viscosities, since the movable member is urged to move across its chamber by the volume of fluid flowing into the one end of the chamber which is cut-off from the fluid outlet at any time. It is therefore not dependent on any forces which vary with viscosity.

Since the sensor can operate over a wide range of viscosities, it is particularly useful for measuring the flow or liquids such as syrups used in the catering industry in dispensing machines for beverages, ice cream, and milk shakes. The sensor can be dimensioned so as to pass solid particles suspended in a liquid within a predetermined size range, for example in a chocolate syrup. In the catering industry it is important that precise quantities of the liquids or fluids to be mixed are added for cost effectiveness, and thus the sensor of this invention can be used in combination with a cut-off valve to supply repeated precise volumes of fluid.

The sensor of this invention has application in many other fields where the flow of fluid must be accurately measured. One example is in the metering and controlling of gasoline flow in a vehicle where a sensor of this type would be useful.

The sensor provides a fluid flow measurement while allowing a continuous flow of fluid through its body.

In one embodiment of the invention the valve assembly is arranged such that in its first position the first end of the chamber is cut off from the outlet and the second end of the chamber is cut off from the inlet, and vice versa in its second position. Thus in the first position of the assembly a fixed volume of fluid in the chamber between the moveable member and the second end of the chamber will flow to the outlet as the member moves to the second end of the chamber. The same volume flows to the outlet from the first end as the movable member is urged back to that end of the chamber when the valve assembly moves to its second position.

Alternatively, some form of shut-off valve may be connected to a sensor device counting the oscillation rate of the moveable member, so as to shut-off the fluid after a certain volume has been supplied.

BRIEF DESCRIPTION OF THE DRAWINGS

The following is a brief description of the accompanying drawings, which show some preferred embodiments of the invention.

DESCRIPTION OF THE PREFERRED EMBODIMENTS

Figure 1:
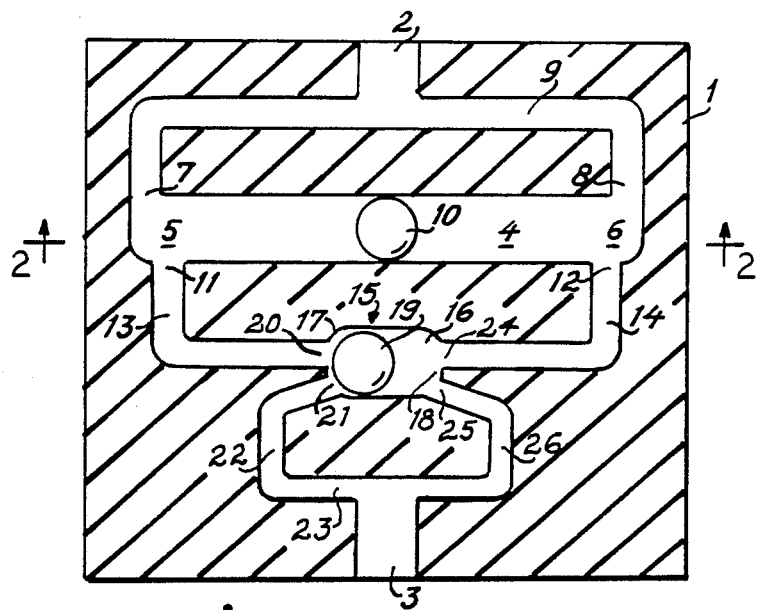
FIG. 1 is a vertical cross-section through a fluid flow sensor according to a first embodiment of the invention.
Figure 2:
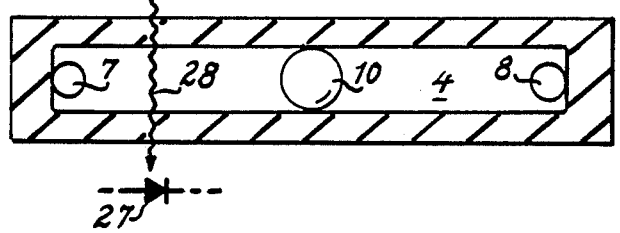
FIG. 2 is a cross-section of the measuring chamber of FIG. 1 along the line 2—2 of FIG. 1, showing a schematic view of a sensing device associated with the measuring chamber.

FIGS. 1 and 2 show a first embodiment of a fluid flow sensor according to the present invention.

As shown in FIG. 1, the sensor basically comprises a housing 1 having a fluid inlet 2, a fluid outlet 3, and a cylindrical measuring chamber 4 between the inlet 2 and the outlet 3. The housing is of any suitable material compatible with the fluid to be metered.

The measuring chamber 4 is a cylindrical chamber and is connected at its opposite first and second ends 5 and 6 to the fluid inlet 2 via channels or conduits 7 and 8, respectively, and accumulator chamber 9. A movable member, such as ball 10 as shown in FIG. 1 or a cylindrical plug, is located in the measuring chamber 4. The ball 10 is of diameter slightly less than that of the measuring chamber 4 so that the ball can move freely in the chamber while allowing only a relatively small amount of fluid to leak around the ball from one end of the chamber to the other.

First and second outlet ports 11 and 12 are located at the first and second ends 5 and 6, respectively, of the chamber 4. Conduits 13 and 14, respectively, connect the outlet ports 11 and 12 to a valve assembly 15.

The valve assembly 15 comprises a capsule-shaped chamber 16 having opposed arcuate valve seats 17 and 18 at its opposite ends, and a valve member or ball 19 movable between the valve seats. The first valve seat 17 has an inlet port 20 connected to the conduit 13, and an outlet port 21 connected via a conduit 22 and chamber 23 to the fluid outlet 3. Similarly, the second valve seat has an inlet port 24 connected to the conduit 14 and an outlet port 25 connected via conduit 26 and the chamber 23 to the fluid outlet 3. The outlet ports 21 and 25 are of smaller diameter than the inlet ports 20 and 24.

In the position shown in FIG. 1 the valve ball 9 is shown seated against the first seat 17 so as to seal the inlet port 20 and the outlet port 21. This effectively cuts off the first end 5 of the measuring chamber 4 from the fluid outlet 3. At the same time since the inlet port 24 and outlet port 25 of the valve assembly are open, the second end 6 of the chamber 4 is connected via port 12, conduit 26 and chamber 23 to the outlet 3. In FIG. 1 the ball 10 is shown in a position intermediate the two ends of the measuring chamber 4.

When fluid flows from the inlet 2 into the sensor with the valve ball 19 in the position shown, there will be a flow of fluid into the left hand side of the chamber 4 via the conduit 7 and into the right hand side of the chamber via the conduit 8. Since the left-hand side of the chamber 4 is cut-off from the fluid outlet 3, while fluid can flow from the right-hand side of the chamber 4 to the outlet through the valve assembly 15, the fluid flowing to the left-hand side of the chamber will force the ball 10 across the chamber until it reaches the right-hand end 6.

The valve ball 19 is held against the seat 17 while the ball 10 is moving across the chamber 4 by the difference in the pressure $P_1$ in the valve chamber 16 and the pressure $P_2$ acting on the ball 19 via the ports 20 and 21. The lower pressure downstream of port 25 is reflected via conduit 26 to chamber 23, less the pressure loss due to flow to outlet port 3. Pressure at port 21 will therefore be equal to the lower pressure in chamber 23, and the difference in pressure is sufficient to hold the valve ball 19 against the seat 17.

When the ball 10 reaches the right-hand end 6 of the measuring chamber 4, it closes the outlet port 12 connecting that end of the chamber to the valve assembly 15. The flow of fluid to the valve chamber 16 via conduit 14 is therefore cut off, and the pressure in conduit 13 increases rapidly, forcing the valve ball 19 away from seat 17 into its position against the second valve seat 18. At this point the first end 5 of the measuring chamber 4 is connected via the opened ports 20 and 21 to the outlet 3. Ports 24 and 25 are closed, so there is no fluid flow through the conduit 14. Incoming fluid from the conduit 8 will urge the ball 10 back across the chamber to the first end 5.

Thus the ball 10 and the valve ball 19 flip-flop from side to side in their respective chambers 4 and 16 at a rate proportional to the fluid flow rate. The fluid flow rate can therefore be measured by any suitable device for sensing the oscillations of the ball 10. The sensing device may, for example, comprise a magnetometer arranged at the side of the housing 1 adjacent the chamber 4, or, as illustrated in FIG. 2, a photocell or photodiode device 27 arranged to detect interruptions in a light beam 28 directed across the chamber 4 caused by the ball 10 passing through the beam. Other sensor devices which may be used include, for example, variable reluctance pickup devices and reflective sensor devices.

The housing 1 and the balls 10 and 19 may be of any suitable materials compatible with the fluid to be passed through the sensor. The ball 10 and chamber 4 wall material must also be compatible with the sensing device to be used for measuring the oscillation rate of the ball. For example, the housing may be of metal, plastic, or epoxy and the balls 10 and 19 may be of metallic, plastic or Teflon brand of material.

The sensor described above can be used for measuring flow rates of fluids over a wide range of viscosities, with suitable dimensioning of the ball 10 and measuring chamber 4. The ball 10 is forced to move across the chamber by fluid flowing into one side of the chamber which is cut-off from the outlet and the speed with which the ball moves is therefore relatively accurate regardless of the viscosity of the fluid, since it does not depend on any viscosity sensitive directional forces.

The ball 10 is sized so as to move freely in the chamber 4. It will seldom, if ever, touch the walls of the chamber 4 because of the flow profile of fluid in a cylindrical pipe or channel. Fluid moves fastest at the center of the channel, while fluid particles next to the wall are slowed down to be almost motionless next to the wall because of frictional forces. Thus there will be a practically motionless boundary layer of fluid at the wall of the chamber 4, and the flow stream of fluid will act centrally on the ball 10, tending to keep it away from the walls of its chamber. The boundary layer provides a cushioning effect and also ensures that there is little fluid leakage past the ball 10 to the opposite end of the chamber 4.

Because of the boundary layer effect described above the wear of the ball 10 and the valve ball 19 will be minimal.

Figure 3:
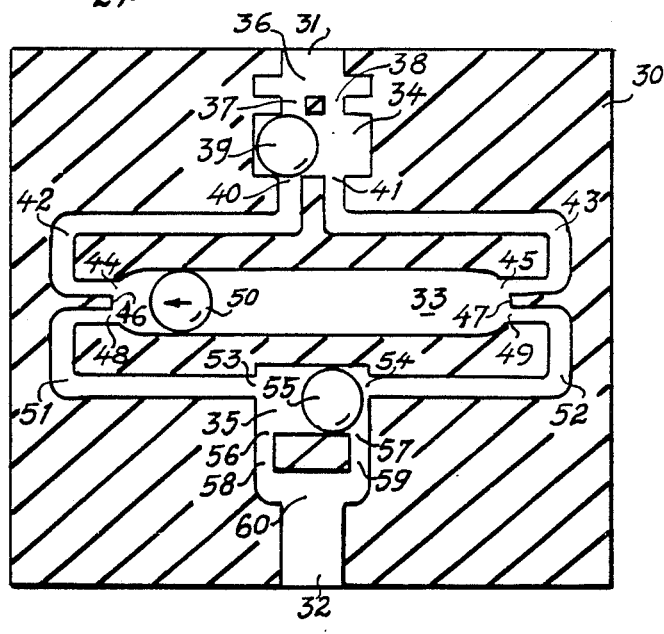
FIG. 3 is a vertical cross-section through a fluid flow sensor according to a second embodiment of the invention.

FIG. 3 shows a second embodiment of the fluid flow sensor according to the invention.

The sensor shown in FIG. 3 basically comprises a housing 30 having a fluid inlet 31, a fluid outlet 32, a measuring chamber 33, a first valving chamber 34 between the fluid inlet 31 and the measuring chamber 33, and a second valving chamber 35 between the measuring chamber 33 and the fluid outlet 32. The housing is of any suitable material compatible with the fluid to be metered.

An accumulator chamber 36 is located between the fluid inlet 31 and the first valving chamber 34. Ports 37 and 38 connect accumulator chamber 36 to opposite ends of the valving chamber 34. A free-wheeling valving chamber ball or other movable member 39 is located in the first valving chamber 34.

Ports 40 and 41 at opposite ends of the valving chamber 34 connect it via passageways 42 and 43, respectively, to inlet ports 44 and 45, respectively, at opposite ends of the measuring chamber 33. Measuring chamber 33 is generally cylindrical and has arcuate valve seats 46, 47 at opposite ends in which inlet ports 44, 45 and outlet ports 48, 49, respectively, are located. A second free-wheeling ball 50 is located in the measuring chamber 33 and is movable between the valve seats 46 and 47.

Outlet ports 48, 49 are connected via passageways 51, 52, respectively, to inlet ports 53, 54, respectively, at opposite ends of the second valving chamber 35. A free-wheeling valving ball 55 is movable between opposite ends of the second valving chamber 35. Outlet ports 56, 57 at opposite ends of the valving chamber are connected via passageways 58, 59, respectively, to an outlet chamber 60 connected to outlet port 32.

The housing 30 and balls 39, 50 and 55 are of any suitable material compatible with the fluid to be metered. For example, the housing may be of metal, plastic, or epoxy, and the balls may be of metallic, plastic, or Teflon brand of material.

The balls 39, 50 and 55 are all of diameter slightly less than that of their respective chambers so that they can move freely while allowing only a relatively small amount of fluid to leak around them from one end of the chambe to the other. The balls are dimensioned so as to seal inlet and outlet ports of their respective chambers as described below.

When the valving balls 39 and 55 are in the position shown in FIG. 3, the outlet port 40 of the first valving chamber 34 is sealed by ball 39, and the inlet port 54 of the second valving chamber 35 is sealed by valving ball 55. Fluid enters the inlet port 31 and flows through accumulator chamber 36 into passageways 37 and 38. Since the outlet port 40 is sealed, fluid flows via outlet port 41 and passageway 43 into the right hand end of measuring chamber 33 via inlet port 45.

Fluid flowing into the right hand end of the measuring chamber 33 is sealed from the outlet 32 by valving ball 55 which seals inlet port 54. The fluid will therefore force the ball 50 across the measuring chamber 33 in the direction of the arrow. Fluid is therefore forced out of the right hand end of the measuring chamber 33, and exits port 48, passing through passageway 51, inlet port 53, second valving chamber 35, outlet port 56 and passageway 58 to the fluid outlet 32.

When the ball 50 reaches the left hand end of chamber 33, it seals the ports 44 and 48. Pressure then increases in chamber 33 and passageway 52, forcing the valving ball 55 in the second valving chamber 35 away from the ports 54 and 57 and to the opposite end of the chamber 33 where it seals ports 53 and 56.

Since passageway 52, and thus passageway 43, are now open to the outlet 32, the pressure in these passageways decreases. When the ball 50 seals the ports 44 and 48, the pressure in conduit 42 increases, and the fluid flow from the inlet 31 acting on the first valving ball 39 via passageway 37 will therefore force this ball across the first valving chamber until it seals the opposite outlet port 41.

The opposite process now occurs, with fluid entering the left hand end of chamber 33 via inlet port 44 forcing the ball 50 across the chamber until it seals the ports 45 and 49 at the right hand end of the chamber. Valving balls 39 and 55 then flip-flop their positions as above, and the process is continuously repeated as long as the fluid flows.

The ball 50 in measuring chamber 33 flip-flops from end to end of the chamber at a rate proportional to the fluid flow rate. The fluid flow rate can therefore be measured, as in the first embodiment, by any device for sensing oscillations of the ball 50. The sensing device may, for example, comprise a magnetometer or photocell arrangement, or a variable reluctance pickup device.

In the second embodiment the fluid sensor is slightly more complex than in the first embodiment, but allows true positive displacement-type measuring since virtually all the fluid is passed through the measuring chamber (except during valve switching time). This provides continuous, non-interrupted flow which is not available with piston-type flow measuring devices. The sensor can be used to measure flow rate with high accuracy for a very broad range of liquids and viscosity.

The sensor of both embodiments can be positioned in the fluid flow path to continuously measure the flow rate. It can be used with fluids over a wide range of viscosities, including syrups used in the catering industry in machines for dispensing beverages, ice cream and milk shakes. The sensor will pass solid particles suspended in a liquid, of reasonable size (such as chocolate syrup). The sensor may also be used for gasoline flow sensing and control in vehicles for energy conservation purposes. The sensor can be dimensioned for use in a wide variety of fluids where fluid flow is to be measured, is relatively inexpensive, and provides a reasonable degree of accuracy.

The moving balls seldom, if ever, touch the walls of their respective chambers due to the flow profile of liquid within a pipe. Thus the sensor has a very low wear factor, which will be even less when the balls are made of Teflon brand of material, for example.

Since the sensor measures volumetric flow, it can be used with a sensing device connected to a cut-off valve at its outlet so as to provide repeated precise volumes of a fluid. This is useful, for example, in the catering field where automatic drinks and ice cream dispensers must be precisely controlled for cost effectiveness.

While the invention has been particularly shown and described with reference to the preferred embodiments, it will be understood that modifications can be made to the disclosed invention without departing from the scope of the invention, which is defined in the appended claims.

What is claimed is:

1. A fluid flow sensor for measuring the volumetric flow of a fluid, comprising:
   a housing having a fluid inlet and a fluid outlet;
   a measuring chamber in the housing having opposite first and second ends, each end being connected to both said fluid inlet and said fluid outlet;
   a body in said measuring chamber movable between said opposite ends of said chamber; and
   a single outlet valve means for alternatively controlling the continuous flow of fluid from said first or second end toward said outlet, said valve means including a member being movable between a first position in which said valve means member is positioned to cut-off said first end of said chamber from said outlet such that fluid in said first end of said chamber urges said body in a first direction towards the end of said chamber, and a second position in which said valve means member is positioned to cut-off said second end of said chamber from said outlet such that fluid in the second end of said chamber urges said body in the opposite direction towards the first end of said chamber;

said outlet valve means member being shaped and positioned to be moved between said first and second positions solely by the difference in fluid pressure exerted on opposite sides of the member between first and second fluids from the first and second ends, respectively, of the measuring chamber as said first and second fluids alternately flow from the ends of said measuring chamber thrugh the outlet valve means and to the fluid outlet and to be maintained in a respective one of said first and second positions, during movement of said body in said measuring chamber, solely by the difference in the pressure exerted on opposite sides of said outlet valve means member developed by the alternate flow of said first and second fluids from said respective first and second ends of said measuring chamber through said valve means and to said outlet.

2. The sensor of claim 1, including means for measuring the reciprocation rate of said body between opposite ends of said measuring chamber.

3. The sensor of claim 1, wherein said outlet valve means comprises:

a cavity in said housing connected in the flow paths between said first and second ends of said measuring chamber and said fluid outlet;

a single outlet valve member movable in the said cavity between said first position in which the flow path of said first fluid from said measuring chamber first end is cut-off from said outlet and the flow path of said second fluid from said measuring chamber second end communicates to said outlet via a portion of said cavity, and said second position in which the flow path of said second fluid from said measuring chamber second end is cut-off from said outlet and the flow path of said first fluid from said first end communicates to said outlet via a portion of said cavity; and said outlet valve member being arranged in said cavity to move between said first and second positions solely by changes in fluid pressures acting on either side of it when said body moves from one end of said measuring chamber to the other.

4. The sensor of claim 1, including:

a single inlet valve means movable between first and second positions for controlling fluid flow from said inlet into said measuring chamber, said inlet and outlet valve means being arranged such that in their first positions the first end of said measuring chamber is cut-off from said outlet and said second end of said measuring chamber is cut-off from said inlet, and vice versa in their second positions, such that in said first positions fluid flows into said first end of said measuring chamber and fluid flows from said second end of said measuring chamber to said outlet, and in said second positions flows in the opposite direction in said measuring chamber to urge said body to said first end of said chamber and fluid flows from said first end to said outlet.

* * * * *